US007250456B2

(12) United States Patent
Eigen et al.

(10) Patent No.: US 7,250,456 B2
(45) Date of Patent: Jul. 31, 2007

(54) COMPOSITION AND ITS USE FOR IMPARTING WATER REPELLENCY TO LEATHER OR FURSKINS, TEXTILES AND OTHER FIBROUS MATERIALS

(75) Inventors: Peter Eigen, Worms (DE); Leonardus Strijbos, Neuenburg am Rhein (DE)

(73) Assignee: TFL Ledertechnik GmbH, Weil am Rhein (DE)

( * ) Notice: Subject to any disclaimer, the term of this patent is extended or adjusted under 35 U.S.C. 154(b) by 377 days.

(21) Appl. No.: 10/502,757

(22) PCT Filed: Jan. 22, 2003

(86) PCT No.: PCT/EP03/00595

§ 371 (c)(1),
(2), (4) Date: Jul. 28, 2004

(87) PCT Pub. No.: WO03/064707

PCT Pub. Date: Aug. 7, 2003

(65) Prior Publication Data

US 2005/0148702 A1 Jul. 7, 2005

(30) Foreign Application Priority Data

Jan. 31, 2002 (CH) .................................... 0167/02

(51) Int. Cl.
*C08K 5/24* (2006.01)

(52) U.S. Cl. ...................... 524/100; 524/131; 524/157; 524/262; 524/269

(58) Field of Classification Search ................ 524/100, 524/131, 157, 262, 269
See application file for complete search history.

(56) References Cited

U.S. PATENT DOCUMENTS 4,076,672 A 2/1978 Huber et al.

FOREIGN PATENT DOCUMENTS

| | | |
|---|---|---|
| DE | 196 29 986 | 1/1998 |
| EP | 1087021 A1 * | 3/2001 |

* cited by examiner

*Primary Examiner*—Peter D. Mulcahy
(74) *Attorney, Agent, or Firm*—Wenderoth, Lind & Ponack, L.L.P.

(57) ABSTRACT

Compositions comprising a mineral oil or wax and a liquid polysiloxane substituted by functional groups, an anionic surfactant and additionally a molecular mono- or polycarboxylic acid and optionally any emulsifiable, hydrophilic or amphiphilic polymer comprising carboxyl groups are outstanding water repellents for leather, furskins, textiles and fibrous materials.

37 Claims, No Drawings

COMPOSITION AND ITS USE FOR IMPARTING WATER REPELLENCY TO LEATHER OR FURSKINS, TEXTILES AND OTHER FIBROUS MATERIALS

The invention relates to a composition comprising a) a natural or synthetic oil or wax, b) a liquid polysiloxane substituted in side chains by phosphate, phosphonate, sulphate, sulphonate, —COOH, —OH, —SH, amino or epoxide-groups, preferably in α,ω-positions, c) an anionic emulsifier, preferably from the group c1) consisting of a $C_8$-$C_{30}$acylamidocarboxylic acid and c2) consisting of a $C_8$-$C_{24}$alkyl- or $C_8$-$C_{24}$alkenyl ether carboxylic acid or $C_8$-$C_{24}$alkaryl ether carboxylic acid, alone or a combination of c1 and c2, d) a molecular mono- or polycarboxylic acid, and e) optionally a hydrophilic or amphiphilic polymer soluble or emulsifiable in water and containing COOH groups, and the use of aqueous emulsions of the composition for imparting water repellency to leather or furskins, textiles and other fibrous materials.

Waterproof and/or washable leathers are of considerable importance in the production of shoes and clothing. Imparting water repellency is therefore an important step in the production of leather. The introduction of liquid siloxanes provided a water repellent with which a good water-repellent effect can be achieved.

EP-B1-0 824 600 discloses that improved water repellency of leathers and furskins can be achieved if leathers or furskins are treated in aqueous float containing special anionic surfactants.

EP-A-0 213 480 describes a process for imparting water repellency to leather and furskins, in which an aqueous emulsion of polysiloxanes is allowed to act on mineral-tanned leather, N-acylamido acids being used as emulsifiers. Polysiloxanes proposed include those having functional groups. After the treatment of the leather, the water absorption and water permeability are reduced. Similar results are obtained according to DE-A-42 14 150 if sulphited reaction products of maleic acid and polysiloxanediols, which contain a paraffinic mineral oil, are used for imparting water repellency.

DE-A-44 15 062 describes a composition for imparting water repellency to leather, which composition contains a silicone oil or a functionalized silicone oil and a carboxymethylated monoetherpolyoxaalkylene as an emulsifier. The compositions may additionally contain a further emulsifier, an oil, wax or a fatliquoring agent/water repellent. The compositions are designated as emulsions which are stable even under application conditions and with which good water repellency can be achieved.

EP-A-1 087 021 describes a leather treatment composition which comprises neutralized polysiloxanes carrying carboxyl or carboxylic anhydride groups, an amphiphilic polymer, an emulsifier and an oil or wax. For use, the water-containing composition is homogenized and a solvent is added. The composition serves for simultaneous imparting of water repellency, softening, filling and retanning of leather. The neutralization of carboxyl groups and the addition of solvent are required in order to provide a storable and stable composition which can be emulsified in the float for the treatment of the leather. A good water repellent effect can be achieved with the composition but the ecological disadvantages of the use of solvents are evident. Furthermore, large total amounts of the individual components are used in order to achieve the desired effects.

Aqueous emulsions are preferably used in leather treatment, and it is not always easy to provide such emulsions which are storable and are also stable during use at the pH of the float (for example 4.5 to 6). If the emulsions break during the treatment, the composition can no longer sufficiently penetrate into the leather. Even the addition of a further component can adversely affect the stability of such emulsions. This results in the formation of undesired precipitates together with deposits on the leather, and the water repellent effect is considerably reduced.

It has now surprisingly been found that compositions having an outstanding water repellent effect are obtained if a mineral oil or wax and a liquid polysiloxane substituted with functional groups preferably in the α,ω-position are mixed with an anionic emulsifier or surfactant, and additionally molecular mono- or polycarboxylic acid is added. Aqueous emulsions of this composition are very stable during storage and use, are distinguished by high float exhaustion and impart to the treated substrates, such as, for example, leather, an excellent water-repellent effect, none of which were achievable using customary compositions with comparable amounts of polysiloxanes.

The invention firstly relates to a substantially solvent-free composition comprising a) a synthetic or natural oil or an emulsifiable, synthetic or natural wax,
b) a liquid polysiloxane substituted by —COOH, sulphonate, sulphate, phosphonate, phosphate, —OH, —SH, —NRR' or epoxide groups, R and R', independently of one another, being H or $C_1$-$C_4$alkyl, and
c) at least one anionic surfactant differing from component d), which additionally comprises d) a molecular, organic compound having a skeleton of altogether from 5 to 30 carbon atoms and optionally hetero atoms from the group consisting of O, S and N, and to whose skeleton at least one carboxyl or carboxyalkyl group is bonded directly or via a bridge group.

By substantially solvent-free is understood a composition having at most 3% by weight, preferable at most 1% by weight, more preferable at most 0.5% by weight of an organic solvent, for example a glycol or glycol ether, in each case based on the overall composition. Especially preferred are compositions, which do not contain an organic solvent.

The oils and waxes of component a) are often used in leather production and are known and commercially available. Synthetic oils are, for example, those based on hydrocarbons, such as mineral oils and white oils, and alkyl esters of fatty acids or hydrogenated fatty acids. The natural oils may be vegetable or animal oils, for example fatty acid esters. Examples of synthetic waxes are paraffins, oxidized paraffins and chloroparaffins. The natural waxes may be vegetable or animal waxes. Oils are preferably used, particularly synthetic hydrocarbon-based oils, since these, unlike waxes, need not be first converted into the liquid state at relatively high temperatures.

The polysiloxanes of component b) are likewise known, described in the relevant literature and commercially available. Functionalized liquid polysiloxanes (or silicone oils) for imparting water repellency to leather are described, for example, in EP-B1-0 213 480, DE-A1-42 14 150, DE-A1 44 15 062, EP-A1-1 087 021, WO 98104748, DE-A1-100 12 722, DE-A1-100 03 322, DE-A1-199 59 949, U.S. Pat. No. 4,931,062 and U.S. Pat. No. 5,702,490. $C_1$-$C_4$Alkyl or $C_1$-$C_4$alkoxy groups or phenyl and preferably methyl groups may be bonded to the Si atoms. The functional groups are preferably bonded to Si atoms via $C_1$-$C_{20}$alkylene groups. The functional groups can be bonded to the terminal Si atoms (α,ω-positions) or to Si atoms in the chain of the polysiloxane (comb-like polysiloxanes). Furthermore, the chains of the comb-like polysiloxanes may comprise structural elements with or without a functional group. The polysiloxanes may also be branched polysiloxanes. Acidic groups may also be present in the form of their anhydrides or in the form neutralized with alkali metal hydroxides or alkaline earth metal hydroxides or ammonia/amines. The polysiloxanes are in general mixtures comprising different chain lengths.

The polysiloxanes of component b) preferably correspond to the formula I $$X—C_mH_{2m}—[Si(R_1)_2—O]_nSi(R_1)_2—C_mH_{2m}—X \quad (I)$$

in which

X is —COOH, sulphonate, sulphate, phosphonate, phosphate, —OH, —SH, —NRR' or

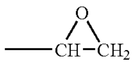

m is a number from 1 to 20 and preferably from 1 to 18, n is a number from 5 to 500, R and R' independently of one another, are H or $C_1$-$C_4$alkyl and $R_1$ is $C_1$-$C_4$alkyl or phenyl.

In formula I, m is preferably a number from 1 to 18 and particularly from 1 to 12 and particularly preferably from 1 to 6, and n is preferably a number from 10 to 200 and particularly preferably a number from 10 to 100. $R_1$ as alkyl may be, for example, methyl, ethyl, n-propyl, isopropyl or butyl. $R_1$ is particularly preferably methyl. X is preferably a carboxyl, hydroxyl, mercapto, phosphate, phosphonate or epoxide group, and particularly preferably a carboxyl or epoxide group.

Suitable polysiloxanes include those in which —OH, —SH or —NHR groups are carboxyalkylated. The carboxyalkyl group may correspond, for example, to the formula $—C_aH_{2a}—COOH$, in which a is a number from 1 to 6 and preferably from 1 to 4. Such derivatives are obtainable in a simple manner by reacting the functional polysiloxanes with ethylenically unsaturated carboxylic acids, such as, for example, acrylic acid, methacrylic acid or maleic acid. These derivatives can also be prepared by reacting functional polysiloxanes with haloalkanecarboxylic acids.

The polysiloxanes may have a viscosity of, for example, from 30 to 8000 and preferably from 50 to 2000 mPa·s, measured at 25° C. The acid number of polysiloxanes comprising acid groups may be from 2 to 200 mg and preferably from 20 to 100 mg KOH/g. The molecular weight may be, for example, from 200 to 30,000 g/mol and preferably from 500 to 10 000 g/mol.

The anionic surfactants may be organic compounds having an acid group as a hydrophilic radical and, as a hydrophobic radical, a hydrocarbon radical which may be interrupted by hetero atoms from the group consisting of S, NR and preferably O, it being possible for the hydrophobic radicals to comprise from 8 to 50 and preferably from 8 to 30 carbon atoms and optionally hetero atoms. Suitable acids are, for example, phosphonic acids, phosphonous acid, sulphonic acids, sulphinic acids, monosulphates, mono- and diphosphates and preferably carboxylic acids. The acids are generally used in neutralized form, for example as alkali metal, alkaline earth metal or ammonium salts. Examples of salts are the lithium, sodium, potassium, ammonium, methylammonium, ethylammonium, dimethylammonium, diethylammonium, trimethylammonium, triethylammonium and mono-, di- and triethanolammonium salts. Carboxylic acids or sulphonic acids and salts thereof are preferred. The anionic surfactants are preferably chosen so that by themselves they result in a substantial improvement in the hydrophobic properties of treated materials.

Anionic surfactants which have particular utility in leather treatment are $C_8$-$C_{30}$acylamidocarboxylic acids or -sulphonic acids, $C_8$-$C_{24}$alkyl or $C_8$-$C_{24}$alkenyl ether carboxylic acid or mono- or di-$C_4$-$C_{24}$—, preferably di-$C_4$-$C_{24}$alkyl- or -alkenylaryl ether carboxylic acid. It has surprisingly been found that particularly good water repellent effects can be achieved in accordance with the invention if mixtures of c1) a $C_8$-$C_{30}$acylamidocarboxylic acid or -sulphonic acid and c2) a $C_8$-$C_{24}$alkyl- or -alkenyl ether carboxylic acid or mono- or di-$C_4$-$C_{24}$alkyl or -alkenylaryl ether carboxylic acid are used.

The acylamidocarboxylic acids of component c1) are likewise known emulsifiers and commercially available. They are preferably $C_8$-$C_{22}$acylamidocarboxylic acids and particularly preferably $C_{10}$-$C_{20}$acylamidocarboxylic acids. The acyl radical is preferably alkyl- or alkenyl-CO. The amidocarboxylic acids preferably comprise from 2 to 6 and particularly preferably from 2 to 4, carbon atoms and an amino group bonded in the β-position and particularly in the α-position. The amino groups can be alkylated, for example with $C_1$-$C_4$alkyl, such as methyl or ethyl. In leather treatment, the use of sarcosides has become established, these also being preferred according to the invention. Known examples are N-oleylsarcosine, N-stearoylsarcosine, N-lauroylsarcosine and N-isononanoylsarcosine. Further examples of known acylamidocarboxylic acids are fatty acid amidoethyl-N-(2-hydroxyethyl)aminopropionic acid, methylcocoyltauric acid, methyloleyltauric acid, N-lauroylethylenediaminetriacetic acid and N-cocoyl-L-glutaric acid. The acylamidocarboxylic acids are generally used in neutralized form, for example as alkali metal or ammonium salts, such as sodium, potassium, ammonium or mono-, di- or triethanolammonium salts.

The ether carboxylic acids of component c2) are likewise known emulsifiers, which are described, for example, in DE-A-44 15 062. The ether carboxylic acids may correspond to the formula II $$R_2—O[CH(R_3)—CH_2—O]_x—C_yH_{2y}—COOH \quad (II),$$

in which $R_2$ is linear or branched $C_8$-$C_{24}$alkyl or $C_8$-$C_{24}$alkenyl, preferably $C_8$-$C_{22}$alkyl or $C_8$-$C_{22}$alkenyl, or mono- or di-$C_4$-$C_{24}$alkylaryl, preferably di-$C_4$-$C_{12}$alkylaryl, $R_3$ is H, methyl or ethyl, x is a number from 1 to 20 and y is a number from 1 to 6 and preferably from 1 to 4.

$R_2$ as alkyl and alkenyl preferably comprises from 12 to 22 and particularly preferably from 12 to 18 carbon atoms. Some examples are dodecyl, tetradecyl, hexadecyl, octadecyl and oleyl. The alkyl group or alkyl groups in the alkaryl radical preferably comprises or comprise from 6 to 12 carbon atoms. Examples are butyl, pentyl, hexyl, octyl, decyl and dodecyl.

$R_3$ is preferably methyl and particularly preferably hydrogen.

In formula II, x is preferably a number from 1 to 12 and particularly preferably from 1.5 to 8.

In formula II, y is preferably the number 1 or 2 and particularly preferably 1.

The molecular, organic compounds of component d) may be mono- or polycarboxylic acids which comprise from 1 to 4 and preferably from 1 to 3 carboxyl groups. They may be aliphatic, cycloaliphatic, heterocycloaliphatic, aromatic and heteroaromatic mono- or polycarboxylic acids whose skeleton preferably comprises altogether from 5 to 25, more preferably from 5 to 16, carbon atoms and optionally hetero atoms from the group consisting of O, S and NR, to which skeleton from 1 to 4 carboxyl groups may be bonded directly or via a bridge group. The skeleton may be substituted by further radicals, in particular by $C_1$-$C_{24}$alkyl, preferably $C_1$-$C_{20}$alkyl, or $C_1$-$C_{24}$alkoxy and preferably $C_1$-$C_{20}$alkoxy, and particularly preferably $C_1$-$C_4$alkyl or $C_1C_4$alkoxy. The molecular, organic compound of component d) may comprise altogether, for example, from 5 to 150, preferably from 5 to 100, more preferably from 5 to 60, and particularly preferably from 5 to 40, carbon atoms and hetero atoms.

The bridge group may be a bivalent to tetravalent, preferably divalent to trivalent, aliphatic radical having 1 to 24 and preferably 1 to 20 carbon atoms, which may comprise hetero atoms from the group consisting of O, S and/or NR and is bonded to the skeleton via a carbon atom or a hetero atom from the group consisting of O, S or NR. R is, for example, H or $C_1$-$C_4$alkyl. The alkylene group may be linear or branched and may preferably comprise from 1 to 18 and particularly preferably from 1 to 6 carbon atoms. The bridge group is preferably alkylene-$(O)_{0\ or\ 1}$-, alkylene-$(S)_{0\ or\ 1}$- or alkylene-$(NR)_{0\ or\ 1}$-, alkylene comprising from 1 to 18 carbon atoms and being linear or branched.

The compounds of component e) may correspond, for example, to the formula III $$(R_5)_i—Z—[(Z_1)_j—(C_zH_{2z}—COOH)]_k \qquad (III)$$

in which $R_5$ is H, $C_1$-$C_{24}$alkyl or $C_1$-$C_{24}$alkoxy, preferably $C_1$-$C_{20}$alkyl or $C_1$-$C_{20}$alkoxy, and particularly preferably $C_1$-$C_{12}$alkyl or $C_1$-$C_{12}$alkoxy, Z is a mono- to tetravalent, preferably mono- to trivalent, $C_1$-$C_{18}$ and preferably $C_5$-$C_{18}$ aliphatic radical; a $C_5$-$C_8$ and preferably $C_5$ or $C_6$ cycloaliphatic radical; a $C_3$-$C_5$ heterocycloaliphatic radical having 1 to 3 hetero atoms; a $C_6$-$C_{10}$ aromatic radical; or a $C_3$-$C_9$ heteroaromatic radical having 1 to 3 hetero atoms, $Z_1$ is —O—, —S— or —NR—, the hetero atoms are selected from the group consisting of O, S and NR, R is H or $C_1$-$C_4$alkyl, i is a number from 1 to 4, j is 0 or 1, z is 0 or a number from 1 to 24, more preferably from 1 to 18 and particularly preferably from 1 to 6, k is a number from 1 to 4, j is 0 when z is 0, and the compound of the formula III comprises altogether from 5 to 150 carbon atoms and hetero atoms.

In the radical NR, R may be, for example, butyl, propyl, ethyl and preferably methyl or H.

$Z_1$ is preferably O or NR.

In formula III, i is preferably from 1 to 3, j is preferably 1, z is preferably a number from 1 to 12 and k is preferably from 1 to 3. The compounds of the formula III preferably comprise from 5 to 25 carbon atoms and optionally additionally hetero atoms from the group consisting of O, S and NR.

The aliphatic radicals may be linear or branched alkyl or alkenyl which particularly preferably comprises from 8 to 18 carbon atoms and to which a carboxyl group or a group —$(Z_1)$—$C_zH_{2z}$—COOH) is bonded. Alkane- and alkenecarboxylic acids are known (for example fatty acids). Alcohols, mercaptans and amines can be derivatized in a known manner with haloalkanecarboxylic acids or ethylenically unsaturated carboxylic acids to give compounds having a group —$Z_1$—$C_zH_{2z}$—COOH.

The aliphatic radicals may be alkylene or alkenylene which preferably has from 5 to 12 carbon atoms and may be interrupted by one or more hetero atoms O, S or NR and to which 2 carboxyl groups, two groups —$(Z_1)$—$(C_zH_{2z}$—COOH) or a carboxyl group or a group —$(Z_1)$—$(C_2H_{2z}$—COOH) and, in the presence of hetero atoms N in the chain, groups —$(C_zH_{2z}$—COOH) are bonded. Alkylenedicarboxylic acids, such as, for example, adipic acid, hexa-, octa- and decamethylenedicarboxylic acids or branched alkylenedicarboxylic acids are familiar to a person skilled in the art. Dicarboxylic acids having two groups —$(Z_1)$—$(C_zH_{2z}$—COOH) are obtainable in a known manner by reacting diols, dimercaptans and diamines with haloalkanecarboxylic acids or ethylenically unsaturated carboxylic acids. Dicarboxylic acids having two groups —$(Z_1)$—$(C_zH_{2z}$—COOH) and one or two groups —$(C_zH_{2z}$—COOH) are obtainable in a known manner by reacting tri- or tetramines, such as, for example, diethylenetriamine and triethylenetetramine, with haloalkanecarboxylic acids or ethylenically unsaturated carboxylic acids. Other dicarboxylic acids are obtainable by reacting ω-carboxylic acids, such as, for example, ω-aminopentanecarboxylic acid or ω-hexanecarboxylic acid with haloalkanecarboxylic acids or ethylenically unsaturated carboxylic acids.

The cycloaliphatic radicals may comprise cycloalkanes, for example cyclopentane, cyclo-hexane, cycloheptane, cyclooctane, cyclodecane and cyclododecane, to which a carboxyl group or a group —$(Z_1)$—$(C_zH_{2z}$—COOH) is bonded. The cycloalkanes are preferably substituted by one or two $C_6$-$C_{18}$alkyl or $C_6$-$C_{18}$alkoxy radicals. Some examples are cyclohexane-carboxylic acid, methylcyclohexanecarboxylic acid, n-butylcyclohexanecarboxylic acid, octylcyclohexanecarboxylic acid, dodecylcyclohexanecarboxylic acid, octadecylcyclo-hexanecarboxylic acid, cyclohexanecarboxymethyl, -ethyl, -propyl or -butyl ether, $C_6$-$C_{18}$alkylcyclohexanecarboxymethyl, -ethyl, -propyl or -butyl ether, N-carboxymethyl-, N-carboxyethyl-, N-carboxypropyl- or N-carboxybutylcyclohexylamine or N-carboxymethyl-, N-carboxyethyl-, N-carboxypropyl- or N-carboxybutyl-$C_6$-$C_{18}$alkylcyclohexylamine.

The cycloaliphatic radical may be cycloalkylene, for example cyclopentylene, cyclohexylene, cycloheptylene, cyclooctylene, cyclodecylene and cyclododecylene, to which two carboxyl groups or two groups —$(Z_1)$—$(C_zH_{2z}$—COOH) or a carboxyl group or a group —$(Z_1)$—$(C_zH_{2z}$—COOH) are bonded. The cycloalkenes may be substituted by a $C_6$-$C_{18}$alkyl or $C_6$-$C_{18}$alkoxy radical. Some examples are cyclopentane-, cyclohexane-, cycloheptane- and cyclododecanedi-carboxylic acid, p-carboxymethoxy-, p-carboxyethoxy-, p-carboxylpropoxy-, p-carboxybutoxy- and p-carboxyhexyloxycyclohexanecarboxylic acid, di-p-carboxymethoxy-, di-p-carboxy-ethoxy-, di-p-carboxypropoxy-, di-p-carboxybutoxy- and di-p-carboxyhexyloxycyclohexane, p-carboxymethylamino-, p-carboxyethylamino-, p-carboxypropylamino-, p-carboxybutylamino- and p-carboxyhexylaminocyclohexanecarboxylic acid, di-p-carboxymethylamino-, di-p-carboxyethylamino-, di-p-carboxypropylamino-, di-p-carboxybutylamino- and di-p-carboxyhexylaminocyclohexane, and 1-carboxyethylamino-4-carboxyethoxycyclohexane.

The cycloaliphatic radicals may also be a trivalent cycloalkyl radical to which altogether three carboxyl groups or groups —$(Z_1)$—$(C_zH_{2z}$—COOH) are bonded. Some examples are cyclohexanetricarboxylic acid, tricarboxymethoxycyclohexane and tricarboxymethylaminocyclohexane.

The heterocycloaliphatic radical may be heterocycloalkyl which preferably has from 5 to 8 ring atoms and from 1 to 3, preferably 1 or 2, hetero atoms from the group consisting of O, S and NR and in which a carboxyl group, a group —$(Z_1)$—$(C_zH_{2z}$—COOH) or a group —$(C_z$—$H_{2z}$—COOH) is bonded to a ring N atom. Examples of heterocycles are pyrrolidine, tetrahydrofuran, pyrazolidine, oxazolidine, thiazolidine, piperidine, piperazine and morpholine. Some examples are proline, N-nonylproline, tetrahydrofurancarboxylic acid, N-nonylpiperidinecarboxylic acid, piperidinecarboxylic acid, N-octyl-N'-carboxyethylpiperazine and N-carboxyethylmorpholine.

The heterocycloaliphatic radicals may be heterocycloalkylene which preferably has 5 to 8 ring atoms and from 1 to 3, preferably 1 or 2, hetero atoms from the group consisting of O, S and NR and in which altogether two carboxyl groups, groups —$(Z_1)$—$(C_zH_{2z}$—COOH) or a group —$(C_zH_{2z}$—COOH) is bonded to a ring N atom. Some examples are tetrahydrofurandicarboxylic acid, N-carboxymethylproline, N,N'-carboxymethylpyrazolidine, N,N'-carboxyethylpiperazine, N,N'-carboxyhexylpiperazine and N-carboxymethylpiperidinecarboxylic acid.

The cycloaliphatic radical may also be a trivalent heterocycloalkyl radical in which altogether three carboxyl groups, groups -$(Z_1)$-$(C_zH_{2z}$—COOH) or groups —$(C_zH_{2z}$—COOH) are bonded to a ring N atom. Examples of heterocycles have been mentioned above. Some examples are N-carboxymethyl-4-carboxymethoxyproline, N-carboxymethyl-4-carboxymethylaminoproline, N-carboxyethyl-4-carboxyethoxyproline, N-carboxybutyl-4-carboxybutoxyproline, N-carboxy-hexyl-4-carboxyhexyloxyproline, carboxyethyl-4-carboxyethylaminoproline, carboxybutyl-4-carboxybutylaminoproline and carboxyhexyl-4-carboxyhexylaminoproline.

The aromatic radicals may be naphthalene or benzene to which a carboxyl group, a carboxy-$C_1$-$C_{24}$alkyl group, a carboxy-$C_2$-$C_{24}$alkenyl group or a group —$(Z_1)$—$(C_zH_{2z}$—COOH) is bonded and which may be substituted by one or two $C_1$-$C_{24}$alkyl and/or $C_1$-$C_{24}$alkoxy and preferably $C_1$-$C_{12}$alkyl and/or $C_1$-$C_{12}$alkoxy radicals. Some examples are benzoic acid, methylbenzoic acid, naphthalenecarboxylic acid, phenylacetic acid, methyl-, butyl-, octyl- or nonylphenyl-acetic acid, phenylpropionic acid, phenylbutyric acid, cinnamic acid; carboxymethoxy-benzene; carboxyethoxybenzene, carboxypropoxybenzene, carboxybutoxybenzene, carboxypentyloxybenzene, carboxyhexyloxybenzene; carboxymethoxy-, carboxyethyoxy-, carboxypropoxy-, carboxybutoxy-, carboxypentyloxy- or carboxyhexyloxy-$C_1$-$C_{12}$alkylbenzene, such as, for example, carboxymethoxynonylbenzene or carboxyhexyloxymethylbenzene; carboxymethylamino-, carboxyethylamino-, carboxypropylamino-, carboxybutylamino-, carboxypentylamino- or carboxyhexylaminobenzene, carboxymethylamino-$C_1$-$C_{12}$alkyl-, carboxyethylamino-$C_1$-$C_{12}$alkyl-, carboxypropylamino-$C_1$-$C_{12}$alkyl-, carboxybutylamino-$C_1$-$C_{12}$alkyl-, carboxypentylamino-$C_1$-$C_{12}$alkyl- and carboxyhexylamino-$C_1C_{12}$alkylbenzene, such as, for example, 1-carboxymethylamino-4-nonylbenzene.

The aromatic radical may be divalent naphthalene or preferably divalent benzene, to each of which two of the groups carboxyl, carboxy-$C_1$-$C_{24}$alkyl, carboxy-$C_2$-$C_{24}$-alkenyl or —$(Z_1)$—$(C_zH_{2z}$—COOH) are bonded and each of which may be substituted by one or two $C_1$-$C_{24}$alkyl and/or $C_1$-$C_{24}$alkoxy and preferably $C_1$-$C_{12}$alkyl and/or $C_1$-$C_{12}$alkoxy radicals. Some examples are phthalic, isophthalic and terephthalic acid, naphthalenedicarboxylic acid, carboxyphenylacetic acid, carboxyphenylpropionic acid, carboxyphenylbutyric acid, carboxyphenylhexanecarboxylic acid, carboxymethoxybenzoic acid, carboxyethoxybenzoic acid, carboxypropoxybenzoic acid, carboxybutoxybenzoic acid, carboxypentyloxybenzoic acid, carboxyhexyloxybenzoic acid, carboxymethylaminobenzoic acid, carboxyethylaminobenzoic acid, carboxypropylaminobenzoic acid, carboxybutylaminobenzoic acid, carboxypentylaminobenzoic acid, carboxyhexylaminobenzoic acid, dicarboxymethoxybenzene, dicarboxyethoxybenzene, dicarboxypropoxybenzene, dicarboxybutoxybenzene, dicarboxypentyloxybenzene, dicarboxyhexyloxybenzene, dicarboxymethylaminobenzene, dicarboxyethylaminobenzene, dicarboxypropylaminobenzene, dicarboxybutylaminobenzene, di(carbaminopentyloxy)benzene, dicarboxyhexylaminobenzene, carboxymethylaminocarboxymethoxybenzene, carboxyethylaminocarboxyethoxybenzene, carboxypropylaminocarboxypropoxybenzene, carboxybutylaminocarboxybutoxybenzene, carboxypentylaminocarboxypentyloxybenzene, carboxyhexylaminocarboxyhexyloxybenzene and carboxymethylaminocarboxyhexyloxybenzene. Alkyl and alkenyl preferably comprise from 1 to 6 and from 2 to 6 carbon atoms, respectively.

The aromatic radical may be trivalent naphthalene or preferably trivalent benzene, to each of which two of the groups carboxyl, carboxy-$C_1$-$C_{24}$alkyl, carboxy-$C_2$-$C_{24}$alkenyl or —$(Z_1)$—$(C_zH_{2z}$—COOH) are bonded and each of which may be substituted by one or two $C_1$-$C_{24}$alkyl and/or $C_1$-$C_{18}$alkoxy and preferably $C_1$-$C_{12}$alkyl and/or $C_1$-$C_{12}$alkoxy radicals. Some examples are trimellitic acid, naphthalenetricarboxylic acid, tricarboxymethylbenzene, tricarboxymethoxybenzoic acid, tricarboxyethoxybenzoic acid, tricarboxypropoxybenzoic acid, tricarboxybutoxybenzoic acid, tricarboxypentyloxybenzoic acid, tricarboxyhexyloxybenzoic acid, tricarboxymethylaminobenzoic acid, tricarboxyethylaminobenzoic acid, tricarboxypropylaminobenzoic acid, tricarboxybutylaminobenzoic acid, tricarboxypentylaminobenzoic acid, tricarboxyhexylaminobenzoic acid and analogous tricarboxylic acids having one or two carboxyalkoxy radicals and two or one carboxyalkylamino radicals.

Examples of such tetracarboxylic acids are pyromellitic acid, prehenitic acid, mellophanic acid and naphthalenetetracarboxylic acids.

The heteroaromatic radicals may comprise five- or six-membered rings or fused ring systems which have from 1 to 3 hetero atoms from the group consisting of O, S and NR and to which a carboxyl group, a carboxy-$C_1$-$C_6$alkyl group, a carboxy-$C_2$-$C_6$alkenyl group or a group -$(Z_1)$-$(C_zH_{2z}$—COOH) is bonded and which may be substituted by one or two $C_1$-$C_{24}$alkyl and/or $C_1$-$C_{24}$alkoxy and preferably $C_1$-$C_{12}$alkyl and/or $C_1$-$C_{12}$alkoxy radicals. Some examples of heterocycles are pyrrole, furan, thiophene, pyrazole, imidazole, pyran, pyridine, pyrimidine, pyrazine, indole, isoindole, coumarone, thionaphthene, carbazole, quinoline, isoquinoline, acridine, chromene, phenothiazine and 1,3,5-triazine. Some examples of carboxylic acids are pyrrolecarboxylic acid, furancarboxylic acid, pyridinecarboxylic acid, indolecarboxylic acid, N-carboxymethylpyrrole, N-carboxyethylpyrrole, N-carboxybutylpyrrole, N-carboxyhexylpyrrole, N-carboxymethylpyrazole, N-carboxyethylpyrazole, N-carboxypropylpyrazole, N-carboxybutylpyrazole, N-carboxyhexylpyrazole, N-carboxymethylimidazole, carboxyethylimidazole, carboxybutylimidazole, carboxyhexylimidazole, carboxymethoxypyrrole, carboxyethoxypyrrole, carboxypropoxypyrrole, carboxybutoxypyrrole, carboxymethylaminopyrrole, carboxy-ethylaminopyrrole, carboxypropylaminopyrrole, carboxybutylaminopyrrole, carboxymethoxypyridine, carboxyethoxypyridine, carboxypropoxypyridine, carboxybutoxypyridine, carboxymethylaminopyridine, carboxyethylaminopyridine, carboxypropylaminopyridine and carboxybutylaminopyridine.

The heteroaromatic radicals may comprise bivalent, five- or six-membered rings or fused ring systems which have from 1 to 3 hetero atoms from the group consisting of O, S and NR and to which altogether two of the groups carboxyl, carboxy-$C_1$-$C_{24}$alkyl, carboxy-$C_2$-$C_{24}$alkenyl or —$(Z_1)$—$(C_zH_{2z}$—COOH) are bonded and which may be substituted by one or two $C_1$-$C_{24}$alkyl and/or $C_1$-$C_{18}$alkoxy and preferably $C_1$-$C_{12}$alkyl and/or $C_1$-$C_{12}$alkoxy radicals. Heterocycles have been mentioned above. Some examples are pyrroledicarboxylic acid, pyridinedicarboxylic acid, furandicarboxylic acid, N-carboxymethylpyrrolecarboxylic acid, N-carboxyethylpyrrolecarboxylic acid, N-carboxybutylpyrrolecarboxylic acid, N-carboxyhexylpyrrolecarboxylic acid, carboxymethoxypyrrolecarboxylic acid, carboxyethoxypyrrolecarboxylic acid, carboxypropoxypyrrolecarboxylic acid, carboxybutoxypyrrolecarboxylic acid, carboxymethylaminopyrrolecarboxylic acid, carboxyethylaminopyrrolecarboxylic acid, carboxypropylaminopyridinecarboxylic acid, carboxybutylaminopyridinecarboxylic acid, carboxymethoxypyridinecarboxylic acid, carboxyethoxypyridinecarboxylic acid, carboxypropylaminopyridinecarboxylic acid, carboxybutoxypyridinecarboxylic acid, dicarboxymethoxypyrrole, dicarboxyethoxypyrrole, dicarboxypropoxypyrrole, dicarboxybutoxypyrrole, dicarboxymethylaminopyrrole, dicarboxyethylaminopyrrole, dicarboxypropoxypyridine, dicarboxybutoxypyridine, dicarboxymethoxypyridine, dicarboxyethoxypyridine, dicarboxypropylaminopyridine, dicarboxybutylaminopyridine, N-carboxymethylcarboxymethoxypyrrole, N-carboxymethylcarboxymethylaminopyrrole, carboxymethoxycarboxymethylaminopyrrole, carboxybutoxycarboxybutylaminopyrrole, carboxymethoxycarboxymethylaminopyridine, carboxybutoxycarboxybutylaminopyridine, dicarboxymethoxypyrimidine and dicarboxybutylaminopyrimidine.

The heteroatomatic radical may comprise trivalent, five- or six-membered rings or fused ring systems which have from 1 to 3 hetero atoms from the group consisting of O, S and NR and to which altogether three groups carboxyl, carboxy-$C_1$-$C_{24}$alkyl, carboxy-$C_2$-$C_{24}$alkenyl or —$(Z_1)$—$(C_zH_{2z}$—COOH) are bonded and which may be substituted by one or two $C_1$-$C_{24}$alkyl and/or $C_1$-$C_{24}$alkoxy and preferably $C_1$-$C_{12}$alkyl and/or $C_1$-$C_{12}$alkoxy radicals. Heterocycles have been mentioned above. Some examples are N-carboxymethyldicarboxymethoxypyrrole, carboxymethyldicarboxymethylaminopyrrole and tricarboxymethylaminopridine.

Compounds of component d) which are particularly preferred according to the invention are those in which carboxy-$C_1$-$C_6$alkyl groups or groups —$(Z_1)$—$(C_zH_{2z}$—COOH), in which Z is O or NR and z is a number from 1 to 18 and preferably from 1 to 6, are bonded to the skeleton.

Very particularly preferred compounds of component e) are carboxyalkylated melamine derivatives of the formula IV

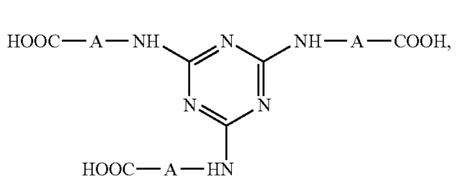

(IV)

in which A is a group —$(C_zH_{2z}$—) and z is a number from 1 to 24, preferably from 1 to 18, more preferably from 1 to 12 and particularly preferably from 1 to 6.

The acids of component d) are generally used in neutralized form, for example as alkali metal or ammonium salts, such as sodium, potassium, ammonium, trimethylammonium, triethylammonium, tributylammonium or mono-, di- or triethanolammonium salts.

The ratios of the components in the composition according to the invention may be, for example, based on the total amount, a) from 20 to 70 and preferably from 35 to 60% by weight of component a)
b) from 10 to 30 and preferably from 15 to 25% by weight of component b),
c) from 6 to 50 and preferably from 10 to 40% by weight of component c),
d) from 0.01 to 10, preferably from 0.1 to 8, particularly preferably from 0.5 to 4% by weight of the component d), the percentages by weight summing to 100%.

If mixtures of c1) a $C_8$-$C_{30}$acylamidocarboxylic acid or -sulphonic acid and c2) a $C_8$-$C_{24}$alkyl or $C_8C_{24}$alkenyl ether carboxylic acid or mono- or di-$C_4$-$C_{14}$alkyl or -alkenylaryl ether carboxylic acid is used, the amounts are, for example, c1) from 1 to 9.8 and preferably from 4 to 9% by weight of component c1) and
c2) from 5 to 40 and preferably from 10 to 30% by weight of component c2).

The composition according to the invention may additionally comprise e) a hydrophilic or amphiphilic polymer emulsifiable or soluble in water and comprising COOH groups for improving the stability and the performance characteristics. The amount may be, for example, from 1 to 20 and preferably from 7.5 to 18% by weight, based on the composition according to the invention. Amphiphilic polymers are known and are already used in the treatment of leather. They are, for example, polymers of ethylenically unsaturated hydrophobic monomers and ethylenically unsaturated hydrophilic monomers. Examples of hydrophobic monomers are optionally substituted alkenes having preferably from 6 to 24 carbon atoms, optionally substituted styrene, vinyl ether, vinyl ester, allyl ether, allyl ester and esters of acrylic acid, methacrylic acid or maleic acid and alkanols having preferably from 6 to 24 carbon atoms and with polyoxyalkylene monoethers, or amides of said acids. The hydrophilic monomers may be, for example, ethylenically unsaturated mono- or dicarboxylic acids, for example acrylic acid, methacrylic acid and maleic acid or maleic monoesters. Such polymers are described, for example, in EP-A-0 658 172, EP-A-0 372 746, EP-A-0 670 909, EP-A-0 412 389 and DE-A-1 196 25 984.

Hydrophilic polymers are likewise known and are composed of hydrophilic monomers which optionally comprise small amounts of hydrophobic monomers. The hydrophilic monomers may be, for example, ethylenically unsaturated mono- or dicarboxylic acids, for example acrylic acid, methacrylic acid and maleic acid, or maleic monoesters, and hydroxyalkyl (for example $C_2$-$C_6$hydroxyalkyl) or polyoxaalkylene esters (polyoxyethylene or polyoxypropylene esters), or vinyl, allyl or methallyl hydroxyalkyl (for example $C_2$-$C_6$hydroxyalkyl) or -polyoxa-alkylene ethers (polyoxyethylene or polyoxypropylene ethers), it being possible for the polymers to comprise identical or different monomers of these types. Hydrophilic polymers are described, for example, in EP-A-0 658 172 and DE-A-196 25 984.

Such polymers are commercially available and are generally offered as aqueous formulations. The composition according to the invention and comprising polymers can in this case additionally comprise small amounts of water, for example up to 16% by weight. Some or all of the carboxyl groups may have been neutralized, for example with NaOH. With the polymers comprising COOH groups, a further improvement in the hydrophobic properties of the treated leather can also be achieved.

The preparation of the composition according to the invention can be carried out in a simple manner by mixing components, the order of the addition being unimportant. The mixing can be effected by stirring, extrusion or kneading. Depending on the choice and ratios of the components, compositions having an oily to pasty consistency are obtained. In order to improve the consistency, water may be added to the composition as early as during the preparation. The compounds of component e) may also be used in the form of concentrated aqueous solutions, the composition according to the invention then additionally comprising small amounts of water, for example up to 16% by weight. These compositions can be used directly in tanning, but the metering and formation of an emulsion in the float may not be very simple. Expediently, an aqueous emulsion is therefore prepared beforehand and added to the float, or the composition is offered in the form of aqueous and easily meterable emulsion concentrates.

It is therefore more advantageous to use an aqueous emulsion and in particular emulsion concentrates of the composition according to the invention. The invention furthermore relates to an emulsion concentrate comprising a) from 30 to 80% by weight and preferably from 40 to 70% by weight of the composition according to the invention and b) from 20 to 70% by weight and preferably from 30 to 60% by weight of water.

The pH of the emulsion concentrates is preferably from 5 to 10 and particularly preferably from 7 to 9. The pH can be established by adding organic bases, ammonia or amines. Suitable organic bases are in particular sodium hydroxide or potassium hydroxide. Suitable amines are in particular mono-, di- or trialkylamines, such as methylamine, ethylamine, N-propylamine, N-butylamine, dimethylamine, diethylamine, di-n-propylamine, di-n-butylamine, trimethylamine, triethylamine, tri-n-propylamine and tri-n-butylamine, and alkanolamines, such as ethanolamine, propanolamine, butanolamine, diethanolamine and triethanolamine. The composition may comprise, for example, from 0.01 to 8 and preferably from 0.1 to 5% by weight of inorganic base, ammonia or amine.

The emulsion concentrates according to the invention have a relatively long shelf life. They do not form any deposits in containers, can be readily reemulsified on phase separation and can be removed without problems from containers. The emulsion concentrates according to the invention have surprisingly also proved very stable in an aqueous acidic medium, for example at a pH of about 4 to 5. At this pH of an aqueous float, wet blue leather, tanned skins or textiles are treated in order to permit penetration of the water repellent. With the composition according to the invention and its high stability in the acidic range of the float, high exhaustion of the float in combination with a surprisingly high water repellency of the treated material is achieved. The properties of leather which are achieved in preceding treatment stages, for example the optical aspect (uniformity), the outstanding feel, physical and mechanical properties and the uniform dyeing of the leather are not adversely affected.

The preparation of the emulsion concentrates according to the invention can be carried out in a simple manner by emulsifying the compositions in water. Furthermore, it is possible and preferable to prepare the emulsion directly with stirring by adding the components a) to d) and optionally e) to water.

The invention furthermore relates to a process for treating and imparting water repellency to fibrous materials, leather, skins and textiles, wherein 1) wet blue leather, tanned skins, textile or fibrous material is treated in an aqueous float with a composition comprising a) a synthetic or natural oil or an emulsifiable, synthetic or natural wax, b) a liquid polysiloxane substituted by —COOH, sulphate, sulphonate, phosphate, phosphonate, —OH, —SH, —NRR' or epoxide groups, R and R', independently of one another, being H or $C_1$-$C_4$alkyl, c) at least one anionic surfactant differing from component d) and d) a molecular, organic compound which has a skeleton comprising altogether from 5 to 30 carbon atoms and optionally hetero atoms from the group consisting of O, S and N and to whose skeleton at least one carboxyl or carboxyalkyl group is bonded, and 2) treatment with acid is then effected, the float is discharged, the material is washed, and a metal salt is allowed to react in an aqueous float on the washed material for fixing.

The invention furthermore relates to the use of the composition according to the invention for imparting water repellency to fibrous materials, leather, furskins and textiles.

In one variant of the process according to the invention, a hydrophilic or amphiphilic polymer soluble or emulsifiable in water and comprising COOH groups can be added to the float before, with or after addition of the composition used in process stage 1.

The composition according to the invention can be used in an amount of from 1 to 20% by weight and preferably from 5 to 15% by weight, based on the shaved weight of a wet blue leather or the dry weight of a tanned skin, textile or fibrous material.

The float length (percent by weight of water, based on shaved weight or dry weight) may be, for example, from 50 to 200%.

The temperature of the float during the water repellent treatment is, for example, from 30 to 70° C. and preferably from 40 to 60° C.

The pH of the float is advantageously adjusted to 4 to 9.

The treatment time may be, for example, 0.5 to 2 hours, excellent results already being obtained in times of about 0.5 to 1.5 hours.

An acid is added to the float after the treatment according to the invention for fixing, so that the pH is from about 3 to 4.5. In the treatment of leather, the use of formic acid has proved particularly suitable for this purpose.

In the second process stage, the water repellent is fixed with metal salts on and in the fibres of leather, furskins, textiles and fibrous materials. Metal salts which are used in leather production also for tanning are particularly suitable, for example metal salts having metal cations of chromium, aluminium, zirconium and titanium. Examples are basic chromium(III) sulphate and basic alum.

The amount of metal salts may be, for example, from 0.1 to 6 and preferably from 0.5 to 4 percent by weight, based on the shaved weight or dry weight.

The treatment time may be, for example, from 0.5 to 2 hours, times of only about 0.5 to 1.5 hours often being sufficient for achieving excellent results.

The temperature of the liquor during the fixing is, for example, from 30 to 70° C. and preferably from 30 to 60° C.

After fixing, the material which has been rendered water repellent is finished in a manner known per se by removing it from the wash, hanging it overnight, sammying it and then setting it out, drying it (optionally in vacuo), conditioning it, staking it and plating it.

The following examples explain the invention in more detail. The Maeser test is carried out according to ASTM D 2099-70.

Abbreviations

Mineral oil: paraffinic mineral oil, specific gravity 0.86 g/cm$^3$ at 15° C.

Carboxypolysiloxane: polydimethylsiloxane having terminal carboxyl groups, an acid number of about 40 mg KOH/g and a viscosity of 550 mPa·s at 25° C.

Polycarboxylic acid a: 6,6',6"-(1,3,5-triazine-2,4,6-triyltriimino)trihexanoic acid Polycarboxylic acid b: stearic acid Polycarboxylic acid c: sebacic acid (disodium salt)

Polycarboxylic acid d: phthalic acid

Polycarboxylic acid e: trimellitic acid

Polycarboxylic acid f: pyromellitic acid

Polycarboxylic acid g: citric acid

Polycarboxylic acid h: p-isononylphenoxyacetic acid

Polycarboxylic acid i: (2-benzothiazolylthio)succinic acid (60% strength)

Polycarboxylic acid j: N-lauroylethylenediaminetriacetic acid

Polycarboxylic acid k: N-cocoyl-L-glutamic acid (monosodium salt, 23% strength)

Carboxyl polymer A: 40% strength copolymer emulsion based on acrylic acid (Brookfield viscosity <2000 mPa·s at 25° C.).

Carboxyl polymer B: 20% strength copolymer emulsion based on styrene (Brookfield viscosity <500 mPa·s at 30° C.).

Carboxyl polymer C: 33% strength copolymer emulsion based on acrylic acid (Brookfield viscosity about 2000 mPa·s at 25° C., analogous to DE-B1-19625984).

Carboxyl polymer D: 35% strength copolymer emulsion based on acrylic acid (Brookfield viscosity 100-500 mPa·s at 25° C.).

Oleyl ether carboxylic acid: oleyl-O—$(CH_2CH_2—O)_2$—$CH_2$—COOH

A) Preparation of Compositions

EXAMPLE A1

The following components (amounts stated in percent by weight)

| | |
|---|---|
| a) mineral oil | 57.0 |
| b) carboxypolysiloxane | 18.3 |
| c) N-oleoylsarcosine | 8.2 |
| d) oleyl ether carboxylic acid | 12.4 |
| e) polycarboxylic acid a (50% strength) | 4.1 |

are stirred at 60° C. until a homogeneous mixture has formed, and then cooled. A light brown, milky emulsion is obtained.

B) Preparation of Emulsions

EXAMPLE B1

2.3 g of polycarboxylic acid a and 2.5 g of 50% strength NaOH are dissolved in 42.7 g of water and heated to 85° C. Thereafter, at constant temperature, 31.3 g of mineral oil, 10 g of carboxypolysiloxane, 4.5 g of N-oleoylsarcosine and 6.7 g of oleyl ether carboxylic acid are added and then stirring is continued until a homogeneous emulsion has formed. Cooling to room temperature is then effected with stirring. A whitish, milky emulsion having a pH of 8.5 and a water content of about 45% is obtained.

Comparative Composition 1

2.5 g of 50% strength NaOH are dissolved in 43.8 g of water and heated to 85° C. At constant temperature, 32.4 g of mineral oil, 10 g of carboxypolysiloxane and 11.3 g of N-oleoylsarcosine are then slowly added. Stirring is then continued until a homogeneous emulsion is formed. The homogeneous emulsion is cooled with stirring.

A whitish milky emulsion having a pH of 8.0 and a water content of about 45% is obtained.

Comparative Composition 2

1.8 g of 50% strength NaOH are dissolved in 44.2 g of water and heated to 85° C. At constant temperature, 32.7 g of mineral oil, 10 g of carboxypolysiloxane and 11.3 g of N-oleyl ether carboxylic acid are then slowly added. Stirring is then continued until a homogeneous emulsion is formed. The homogeneous emulsion is cooled with stirring.

A whitish, milky emulsion having a pH of 8.5 and a water content of about 45% is obtained.

Comparative Composition 3

2 g of 50% strength NaOH are dissolved in 44 g of water and heated to 85° C. At constant temperature, 32.7 g of mineral oil, 10 g of carboxypolysiloxane, 4.5 g of N-oleoylsarcosine and 6.8 g of N-oleyl ether carboxylic acid are then slowly added. Stirring is then continued until a homogeneous emulsion has formed. The homogeneous emulsion is cooled with stirring.

A whitish, milky emulsion having a pH of 8.4 and a water content of about 45% is obtained.

EXAMPLE B2

2.3 g of polycarboxylic acid a and 2.9 g of 50% strength NaOH are dissolved in 42.5 g of water and heated to 85° C. At constant temperature, 31 g of mineral oil, 10 g of carboxypolysiloxane and 11.3 g of N-oleoylsarcosine are then slowly added. Stirring is then continued until a homogeneous emulsion has formed. The homogeneous emulsion is cooled with stirring.

A whitish, milky emulsion having a pH of 8.0 and a water content of about 45% is obtained.

EXAMPLE B3

2.3 g of polycarboxylic acid a and 2.4 g of 50% strength NaOH are dissolved in 42.9 g of water and heated to 85° C. At constant temperature, 31.1 g of mineral oil, 10 g of carboxypolysiloxane and 11.3 g of N-oleyl ether carboxylic acid are then slowly added. Stirring is then continued until a homogeneous emulsion is formed. The homogeneous emulsion is cooled with stirring.

A whitish, milky emulsion having a pH of 8.0 and a water content of 45% is obtained.

EXAMPLES B4-B13 x g of polycarboxylic acid b-k (table 1) and 2.5 g of 50% strength NaOH are dissolved in 43 g of water and heated to 85° C. Thereafter, at constant temperature, 31.3 g of mineral oil, 10 g of carboxypolysiloxane, 4.5 g of N-oleoylsarcosine and 6.7 g of oleyl ether carboxylic acid are added and stirring is then continued until a homogeneous emulsion is formed. Cooling to room temperature is then effected with stirring. A whitish, milky emulsion having a pH of from 7 to 8.5 and a water content of about 45% is obtained.

TABLE 1

| Example | Amount in g | Polycarboxylic acid |
|---|---|---|
| B4 | 1.1 | b |
| B5 | 1.4 | c |
| B6 | 1.1 | d |
| B7 | 1.1 | e |
| B8 | 1.1 | f |
| B9 | 1.1 | g |
| B10 | 1.1 | h |
| B11 | 1.8 | i |
| B12 | 1.1 | j |
| B13 | 4.9 | k |

EXAMPLES B14-B16

2.3 g of polycarboxylic acid a and 1.8 g of 50% strength NaOH are dissolved in 35 g of water and heated to 85° C. At constant temperature, 30 g of mineral oil, 10 g of polysiloxane, 4.5 g of N-oleoylsarcosine and 6.8 g of oleyl ether carboxylic acid are then added. y g of carboxyl polymer (A, A/B, C) are then added (table 2), after which stirring is continued until a homogeneous emulsion has formed. The homogeneous emulsion is cooled with stirring.

Properties

A whitish, milky emulsion having a pH of 7.5-8.5 and a water content of about 43% is obtained.

TABLE 2

| Example | Amount in g | Carboxyl polymer |
|---|---|---|
| B14 | 10.2 | Carboxyl polymer A |
| B15 | 2.5/15.0 | Carboxyl polymer A/B |
| B16 | 9.3 | Carboxyl polymer C |

EXAMPLE B17

2.3 g of polycarboxylic acid a and 2.9 g of 50% strength NaOH are dissolved in 35.6 g of water and heated to 85° C. At constant temperature, 27 g of mineral oil, 10 g of polysiloxane, 4.5 g of N-oleoylsarcosine and 6.7 g of oleyl ether carboxylic acid are then added. 11 g of carboxyl polymer D are then added, after which stirring is continued until a homogeneous emulsion is formed. The homogeneous emulsion is cooled with stirring.

Properties

A whitish, milky emulsion having a pH of 8.5 and a water content of about 45% is obtained.

C) Use Examples

EXAMPLE C1

Imparting Water Repellency to Leather

The stated percentages are based on the shaved weight of the wet blue leather. A retanned and dyed wet blue (chrome-tanned leather) having a shaved thickness of 1.8 mm is added to 100% by weight of water heated to 50° C. Thereafter, 10% by weight of an emulsion concentrate according to example B1, diluted in the ratio of 1:4 with water, are added and the float is allowed to act on the leather for 90 minutes (pH about 5). Thereafter, 1% by weight of 85 percent strength formic acid diluted in the ratio 1:5 with water is added and treatment is carried out for 10 minutes. Thereafter, a further 1% by weight of 85 per cent strength formic acid diluted in the ratio 1:5 with water is added and treatment is carried out for a further 30 minutes. The pH is then 3.6.

The float is discharged and the leather is washed with 300% by weight of water heated to 40° C. After the wash water has been discharged, 100% by weight of water heated to 40° C. and 3% by weight of chromium salt (Chromosale BD) are added and treatment is carried out for 60 minutes. Thereafter, washing is effected with 300% by weight each of water at 30° C. and at 20° C. for 10 minutes in each case and the leather is removed and dried.

The properties are shown in table 3.

Comparative Example 1

With the comparative composition 1, the procedure is as in example C1. The properties are shown in table 3.

Comparative Example 2

With the comparative composition 2, the procedure is as in example C1. The properties are shown in table 3.

Comparative Example 3

With the comparative composition 3, the procedure is as in example C1. The properties are shown in table 3.

TABLE 3

| Example | Maeser values[1)] | Emulsion stability[2)] (h) |
|---|---|---|
| C1 | 30 000 | >1 |
| Comparative example 1 | 18 000 | 0.5 |
| Comparative example 2 | 16 000 | 0.5 |
| Comparative example 3 | 23 000 | 0.5 |

[1)]Mean value of 3 measurements

[2)]The emulsion stability is determined as follows: the concentrate is diluted with water at 60° C., cooled and allowed to stand. The time when a phase separation is visible is then determined.

EXAMPLE C2

With the composition according to example B2, the procedure is as in example C1. The properties are shown in Table 4.

EXAMPLE C3

With the composition according to example B3, the procedure is as in example C1. The properties are shown in table 4.

TABLE 4

| Example | Maeser values[1)] | Emulsion stability[2)] (h) |
|---|---|---|
| Comparative example 1 | 18 500 | 0.5 |
| C2 | 22 000 | 0.65 |
| Comparative example 2 | 15 500 | 0.5 |
| C3 | 20 500 | 1 |

EXAMPLE C4

With the composition according to example B4 (with polycarboxylic acid b), the procedure is as in example C1. The properties are shown in table 5.

EXAMPLE C5

With the composition according to example B5 (with polycarboxylic acid c), the procedure is as in example C1. The properties are shown in table 5.

EXAMPLE C6

With the composition according to example B6 (with polycarboxylic acid d), the procedure is as in example C1. The properties are shown in table 5.

TABLE 5

| Example | Maeser values[1)] | Emulsion stability[2)] (h) |
|---|---|---|
| Comparative example 3 | 24 500 | 0.5 |
| C4 | 24 600 | 0.8 |
| C5 | 28 000 | 1 |
| C6 | 27 000 | 1 |

EXAMPLE C7

With the composition according to example B7 (with polycarboxylic acid e), the procedure is as in example C1. The properties are shown in table 6.

EXAMPLE C8

With the composition according to example B8 (with polycarboxylic acid f), the procedure is as in example C1. The properties are shown in table 6.

EXAMPLE C9

With the composition according to example B9 (with polycarboxylic acid g), the procedure is as in example C1. The properties are shown in table 6.

EXAMPLE C10

With the composition according to example B10 (with polycarboxylic acid h), the procedure is as in example C1. The properties are shown in table 6.

EXAMPLE C11

With the composition according to example B11 (with polycarboxylic acid i), the procedure is as in example C1. The properties are shown in table 6.

EXAMPLE C12

With the composition according to example B12 (with polycarboxylic acid j), the procedure is as in example C1. The properties are shown in table 6.

EXAMPLE C13

With the composition according to example B13 (with polycarboxylic acid k), the procedure is as in example C1. The properties are shown in table 6.

TABLE 6

| Example | Maeser values[1)] | Emulsion stability[2)] (h) |
|---|---|---|
| Comparative example 3 | 23 500 | 0.5 |
| C7 | 28 000 | 1 |
| C8 | 27 500 | 1 |
| C9 | 24 000 | 1 |
| C10 | 29 000 | >1 |
| C11 | 28 500 | >1 |
| C12 | 28 000 | >1 |
| C13 | 29 500 | >1 |

EXAMPLE C14

With the composition according to example B14 (with carboxyl polymer A), the procedure is as in example C1. The properties are shown in table 7.

EXAMPLE C15

With the composition according to example B15 (with carboxyl polymer A/B), the procedure is as in example C1. The properties are shown in table 7.

EXAMPLE C16

With the composition according to example B16 (with carboxyl polymer C), the procedure is as in example C1. The properties are shown in table 7.

EXAMPLE C17

With the composition according to example B17, the procedure is as in example C1. The properties are shown in table 7.

TABLE 7

| Example | Maeser values[1)] | Emulsion stability[2)] (h) |
|---|---|---|
| C14 | 19 000 | >1 |
| C15 | 32 000 | >1 |
| C16 | 48 000 | >1 |
| C17 | >60 000 | >1 |

What is claimed is:

1. A substantially solvent-free composition comprising a) from 20 to 70% by weight of a synthetic or natural oil or an emulsifiable, synthetic or natural wax, b) from 10 to 30% by weight of a liquid polysiloxane substituted by —COOH, sulphate, sulphonate, phosphate, phosphonate, —OH, —SH, —NRR' or epoxide groups, R and R', independently of one another, being H or $C_1$-$C_4$alkyl, and c) from 6 to 50% by weight of at least one anionic surfactant differing from component d), which additionally comprises d) from 0.01 to 10% by weight of a molecular, organic compound with a maximum of 150 total carbon and hetero atoms and which has a skeleton of from 5 to 30 carbon atoms and to whose skeleton at least one carboxyl or carboxyalkyl group is bonded directly or via a bridge group, the percentages by weight summing to 100%.

2. A composition according to claim 1, wherein the component a) is a synthetic hydrocarbon-based oil.

3. A composition according to claim 1, wherein the polysiloxanes of component b) are substituted in α,ω-positions by —COOH, sulphate, sulphonate, phosphate, phosphonate, —OH, —SH, —NRR' or epoxide groups.

4. A composition according to claim 3, wherein the polysiloxanes of component b) correspond to the formula I $$X—C_mH_{2m}—[Si(R_1)_2—O]_nSi(R_1)_2—C_mH_{2m}—X \quad (I),$$

in which

X is —COOH, sulphate, sulphonate, phosphate, phosphonate, —OH, —SH, —NRR' or

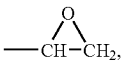, m is a number from 1 to 20, n is a number from 5 to 500,

R and R', independently of one another, are H or $C_1$-$C_4$alkyl and $R_1$ is $C_1$-$C_4$alkyl or phenyl.

5. A composition according to claim 4, wherein, in formula I, m is a number from 1 to 12 and n is a number from 10 to 200.

6. A composition as claimed in claim 1, wherein the anionic surfactant is an organic compound having an acid group as a hydrophilic radical and, as a hydrophobic radical, a hydrocarbon radical optionally interrupted by hetero atoms from the group consisting of S, NR and preferably O, the hydrophobic radical comprising from 8 to 50 carbon atoms and optionally hetero atoms, and R being H or $C_1$-$C_4$alkyl.

7. A composition according to claim 6, wherein the anionic surfactant is a sulphonic or carboxylic acid, a mono- or diphosphoric ester or a salt thereof.

8. A composition according to claim 7, which comprises $C_8$-$C_{30}$acylamidocarboxylic acid or -sulphonic acid, $C_8$-$C_{24}$alkyl or $C_8$-$C_{24}$alkenyl ether carboxylic acids or mono- or di-$C_4$-$C_{24}$alkyl- or -alkenylaryl ether carboxylic acids or salts thereof.

9. A composition as claimed in claim 8, wherein the ether carboxylic acid corresponds to the formula II $$R_2—O[CH(R_3)—CH_2—O]_x—C_yH_{2y}—COOH \quad (II),$$

in which $R_2$ is linear or branched $C_8$-$C_{24}$alkyl or $C_8$-$C_{24}$alkenyl or mono- or di-$C_4$-$C_{24}$alkylaryl, $R_3$ is H, methyl or ethyl, x is a number from 1 to 20 and y is a number from 1 to 4.

10. A composition according to claim 1, which comprises a mixture of c1) a $C_8$-$C_{30}$acylamidocarboxylic acid or -sulphonic acid and c2) a $C_8$-$C_{24}$alkyl or $C_8$-$C_{24}$alkenyl ether carboxylic acid or mono- or di-$C_4$-$C_{24}$alkyl or -alkenylaryl ether carboxylic acid.

11. A composition according to claim 1, wherein the molecular, organic compound of component d) is a mono- or polycarboxylic acid which comprises from 1 to 4 carboxyl groups.

12. A composition according to claim 11, which comprises an aliphatic, cycloaliphatic, heterocycloaliphatic, aromatic or heteroaromatic mono- or polycarboxylic acid whose skeleton comprises from 5 to 25 carbon atoms, to which from 1 to 4 carboxyl groups are bonded directly or via a bridge group, the skeleton being unsubstituted or substituted by $C_1$-$C_{24}$alkyl or $C_1$-$C_{24}$alkoxy.

13. A composition according to claim 12, wherein the bridge group is a bivalent to tetravalent, aliphatic radical which has 1 to 24 carbon atoms, and which is bonded to the skeleton via a carbon atom or a hetero atom from the group consisting of O, S and NR, R being H or $C_1$-$C_4$alkyl.

14. A composition according to claim 13, wherein the aliphatic radical is a linear or branched alkylene group which comprises from 1 to 18 carbon atoms.

15. A composition according to claim 14, wherein the bridge group is a linear or branched alkylene-$(O)_{0\ or\ 1}$-, alkylene-$(S)_{0\ or\ 1}$- or alkylene-$(NR)_{0\ or\ 1}$-, alkylene comprising from 1 to 18 carbon atoms, R being H or $C_1$-$C_4$alkyl.

16. A composition according to claim 1, wherein the compounds of component d) correspond to the formula III $$(R_5)_i—Z—[Z_1)_j—(C_zH_{2z}—COOH]_k \quad (III),$$

in which $R_5$ is H, $C_1$-$C_{24}$alkyl or $C_1$-$C_{24}$alkoxy,

Z is a mono- to tetravalent $C_1$-$C_{24}$ aliphatic radical; a $C_5$-$C_8$ cycloaliphatic radical; a $C_3$-$C_5$ heterocycloaliphatic radical having 1 to 3 hetero atoms; a $C_6$-$C_{10}$ aromatic radical; or a $C_3$-$C_9$ heteroaromatic radical having 1 to 3 hetero atoms, $Z_1$ is —O—, —S— or —NR—, the hetero atoms are selected from the group consisting of O, S and NR, R is H or $C_1$-$C_4$alkyl, i is a number from 1 to 4, j is 0 or 1, z is 0 or a number from 1 to 24, k is a number from 1 to 4, j is 0 when z is 0, and the compound of the formula III comprises from 5 to 150 carbon atoms and hetero atoms.

17. A composition according to claim 16, wherein $Z_1$ is O, or NR.

18. A composition according to claim 16, wherein, in formula III, i is from 1 to 3, j is 1, z is a number from 1 to 12 and k is from 1 to 3.

19. A composition according to claim 1, wherein the compounds of component d) are those in which a carboxy-$C_1$-$C_6$alkyl group or a group $—(Z_1)—(C_zH_{2z}—COOH)$, in which $Z_1$ is O or NR and z is a number from 1 to 18, is bonded to the skeleton, R being H or $C_1$-$C_4$ alkyl.

20. A composition according to claim 1, wherein the compounds of the component d) are carboxyalkylated melamine derivatives of the formula IV

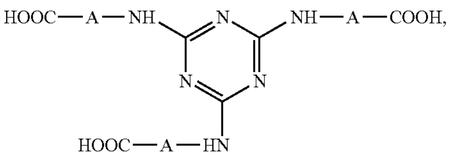

(IV)

in which A is a group $—(C_zH_{2z}—)$ and z is a number from 1 to 18.

21. A composition according to claim 1, wherein the ratios of components a) to d), based on the total amount, are a) from 35 to 60% by weight of component a), b) from 15 to 25% by weight of component b), c) from 10 to 40% by weight of component c), and d) from 0.1 to 8% by weight of component d), the percentages by weight summing to 100%.

22. A composition according to claim 21, wherein the amount in the case of mixtures comprising c1) a $C_8$-$C_{30}$acylamidocarboxylic acid or -sulphonic acid and c2) a $C_8$-$C_{24}$alkyl or $C_8$-$C_{24}$alkenyl ether carboxylic acid or mono- or di-$C_4$-$C_{24}$-alkyl or -alkenylaryl ether carboxylic acid are c1) from 1 to 9.8% by weight of component c1) and c2) from 5 to 40% by weight of component c2), based on the total amount of the composition.

23. A composition according to claim 1, which additionally comprises e) a hydrophilic or amphiphilic polymer soluble or emulsifiable in water and containing COOH.

24. A composition according to claim 23, wherein the amount of e) is from 1 to 20% by weight, based on the composition.

25. A composition according to claim 23, wherein the amphiphilic polymer is a polymer of ethylenically unsaturated hydrophobic monomers and ethylenically unsaturated hydrophilic monomers, and the hydrophilic polymer is a polymer of ethylenically unsaturated hydrophilic monomers.

26. A composition according to claim 25, wherein the hydrophobic monomers are alkenes having from 6 to 24 carbon atoms, styrene, vinyl ether, vinyl ester, allyl ether, allyl ester and esters of acrylic acid or methacrylic acid or maleic acid and alkanols, or amides of these carboxylic acids having from 6 to 18 carbon atoms or polyoxaalkylene monoethers and the hydrophilic monomers are ethylenically unsaturated mono- or dicarboxylic acids.

27. An emulsion concentrate comprising a) from 30 to 80% by weight of the composition according to claim 1 and b) from 20 to 70% by weight of water.

28. A process for treating and imparting water repellency to fibrous materials, leather, furskins and textiles, wherein 1) wet blue leather, tanned skins, textile or fibrous material is treated in an aqueous float with a composition comprising a composition according to claim 1, and 2) treatment with acid is then effected, the float is discharged, the material is washed, and a metal salt is allowed to react in an aqueous float on the washed material for fixing.

29. A process according to claim 28, wherein the composition is used in an amount of from 1 to 20% by weight, based on the shaved weight of a tanned leather or the dry weight of furskins, textiles or fibrous materials.

30. A composition according to claim 1, wherein one or more of the carbon atoms forming the skeleton is replaced by a hetero atom selected from the group consisting of O, S and N.

31. A composition according to claim 12, wherein one or more of the carbon atoms forming the skeleton is replaced by a hetero atom selected from the group consisting of O, S and NR, R being H or $C_1$-$C_4$ alkyl.

32. A composition according to claim 13, wherein one or more of the carbon atoms forming the aliphatic radical is replaced by a hetero atom selected from the group consisting of O, S and NR, R being H or $C_1$-$C_4$ alkyl.

33. A composition according to claim 16, wherein $R_5$ is $C_1$-$C_{12}$ alkyl or $C_1$-$C_{12}$ alkoxy.

34. A composition according to claim 21, wherein the ratio of component d) is from 0.5 to 4% by weight.

35. A composition according to claim 22, wherein the amount of component c1) is from 4 to 9% by weight, and the amount of component c2) is from 10 to 30% by weight.

36. A composition according to claim 26, wherein the hydrophilic monomer is acrylic acid, methacrylic acid or maleic acid.

37. An emulsion according to claim 27, comprising from 40 to 70% by weight of the composition according to claim 1 and 30 to 60% by weight of water.

* * * * *